Patented Dec. 12, 1933

UNITED STATES PATENT OFFICE 1,939,365

PARAPHENYLENEDIAMINE DIPICRATE AND PROCESS OF PREPARING SAME

Jean Piccard, Lower Berkshire Valley, N. J., assignor to Hercules Powder Company, Wilmington, Del., a corporation of Delaware No Drawing. Application January 23, 1931
Serial No. 510,772

3 Claims. (Cl. 260—130.5)

My invention relates to a new composition of matter. The composition embodying my invention comprises paraphenylenediamine dipicrate. Paraphenylenediamine dipicrate, heretofore not known, I have found to be a composition possessing numerous advantages rendering it adaptable for a variety of uses and, more particularly, for use in connection with the explosives art. The composition is insensitive to friction and blows, but may be ignited and burns with an intensely hot flame. It may be used as a primer charge over various known explosives, as fulminate, diazodinitrophenol, lead azide, etc. and with oxidizing salts, as potassium chlorate, barium nitrate, etc. When mixed with certain oxidizing salts paraphenylenediamine dipicrate will be exploded by a blow.

Paraphenylenediamine dipicrate is of special value for use in blasting caps, since in admixture with oxidizing salts it may be readily ignited by means of the usual bridge wire of an electric blasting cap and since admixed with oxidizing salts it burns with an intensely hot flame, such mixtures lend themselves to use as a top or initiating charge over a primary detonating compound as fulminate, diazodinitrophenol, lead azide, etc., etc.

Further, since paraphenylenediamine dipicrate decomposes with an intensively hot flame and since it does not detonate, it is of special value in delay electric blasting caps for the ignition of the time fuse.

Paraphenylenediamine dipicrate may be readily produced by mixing a solution of paraphenylenediamine in alcohol, as for example, ethyl, methyl, etc., etc. alcohol, or in ether, or in a hydrocarbon with a solution of picric acid in one of such solvents or in water. For the preparation, for example, of paraphenylenediamine dipicrate there is mixed a boiling or nearly boiling solution of 8 grams of paraphenylenediamine in 35 cc. of ethyl alcohol with a boiling or nearly boiling solution of 32 grams of picric acid in 320 cc. of ethyl alcohol. Crystallization commences immediately and after cooling is almost quantitative.

The picric acid and paraphenylenediamine react to form paraphenylenediamine dipicrate, which being only slightly soluble in the alcohol, may be readily separated therefrom by cooling and filtration.

The reaction involved in the preparation of paraphenylenediamine dipicrate may be graphically shown as follows:

$C_6H_4(NH_2)_2 + 2C_6H_2(NO_2)_3OH =$
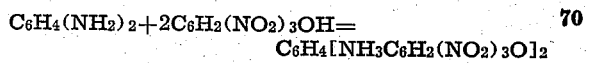
$C_6H_4[NH_3C_6H_2(NO_2)_3O]_2$ It will be understood that my invention from the broad standpoint contemplates paraphenylenediamine dipicrate as a new composition of matter and that I contemplate as within the scope of my invention the new composition of matter paraphenylenediamine dipicrate however produced and for whatever use it may be adaptable. More particularly I contemplate as within the scope of my invention the addition product of paraphenylenediamine and picric acid.

What I claim and desire to protect by Letters Patent is:

1. Paraphenylenediamine dipicrate.
2. The method of producing paraphenylenediamine dipicrate which includes reacting in solution paraphenylenediamine and picric acid.
3. The method of producing paraphenylenediamine dipicrate which includes admixing an alcoholic solution of paraphenylenediamine and picric acid and separating from the alcohol the paraphenylenediamine dipicrate formed.

JEAN PICCARD.